Jan. 6, 1931.  G. B. KING  1,788,304
GRAMOPHONE
Filed April 8, 1929   10 Sheets-Sheet 2

INVENTOR
George B. King
BY
ATTORNEYS

Jan. 6, 1931.  G. B. KING  1,788,304
GRAMOPHONE
Filed April 8, 1929  10 Sheets-Sheet 4
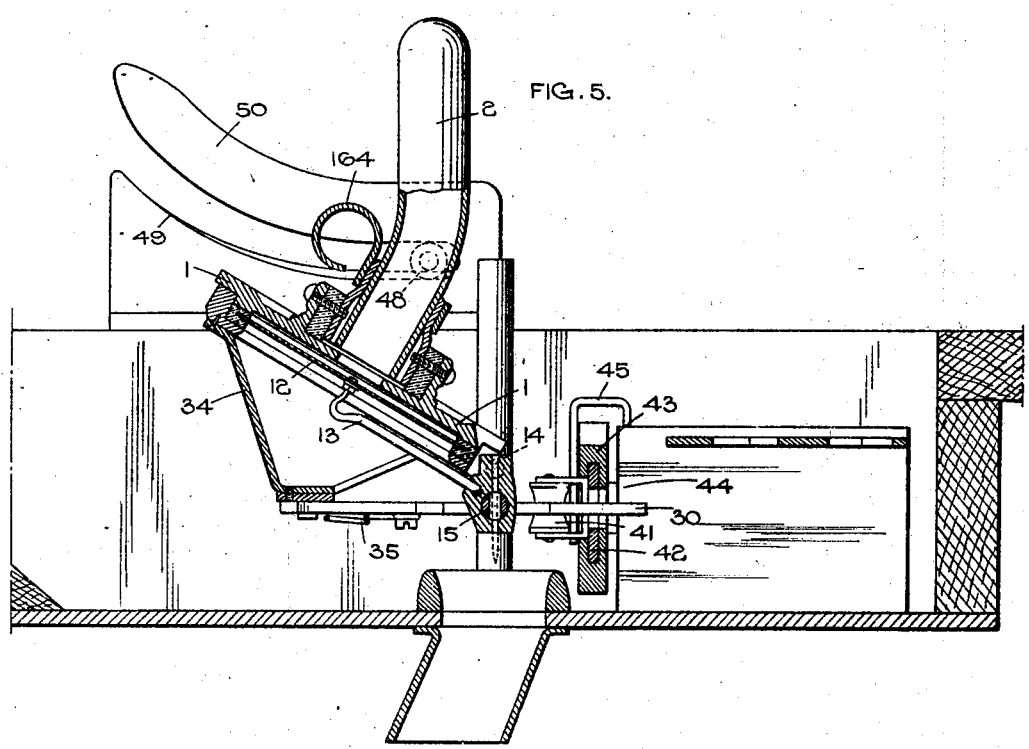
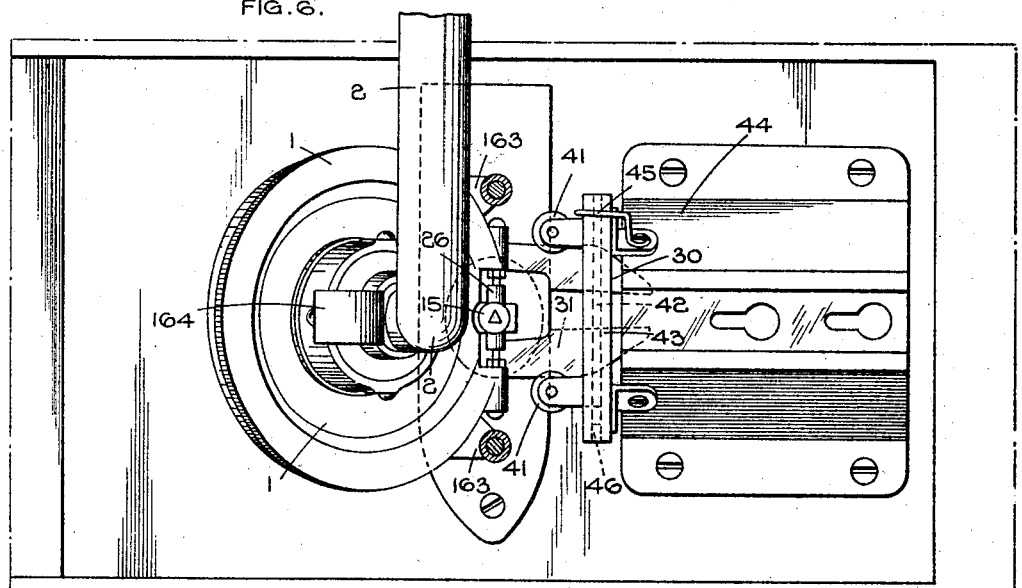
INVENTOR
George B. King
BY
ATTORNEYS

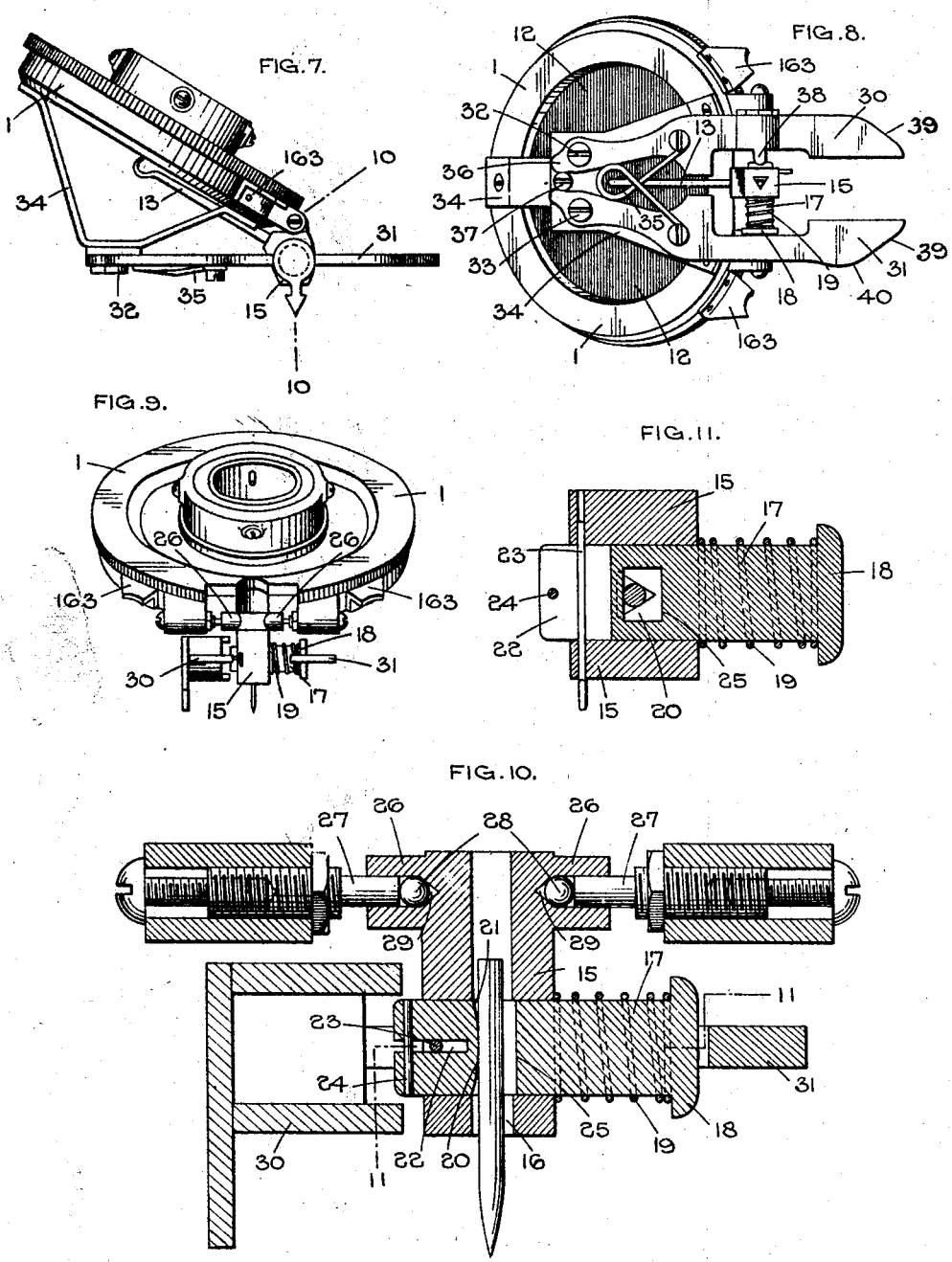

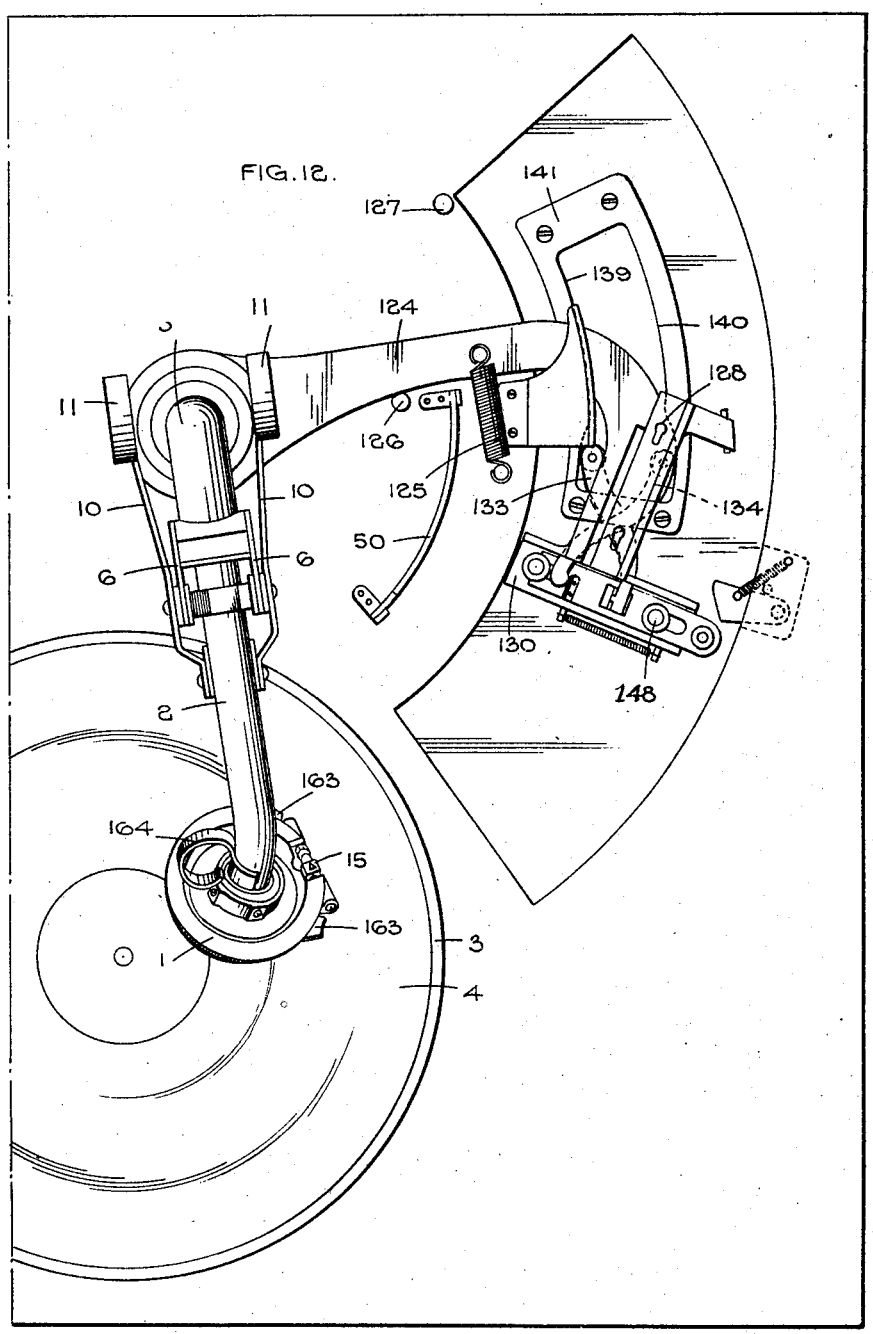

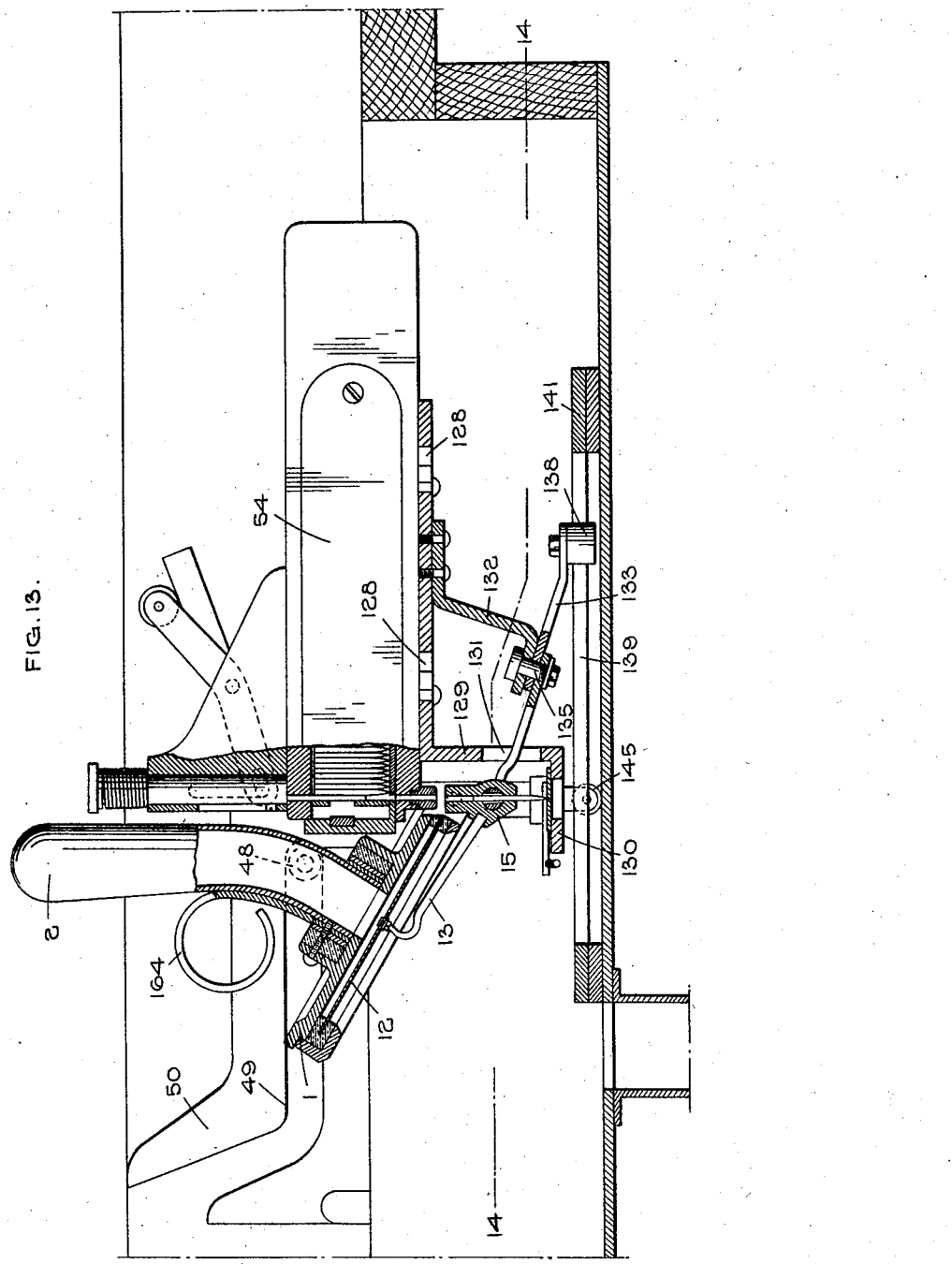

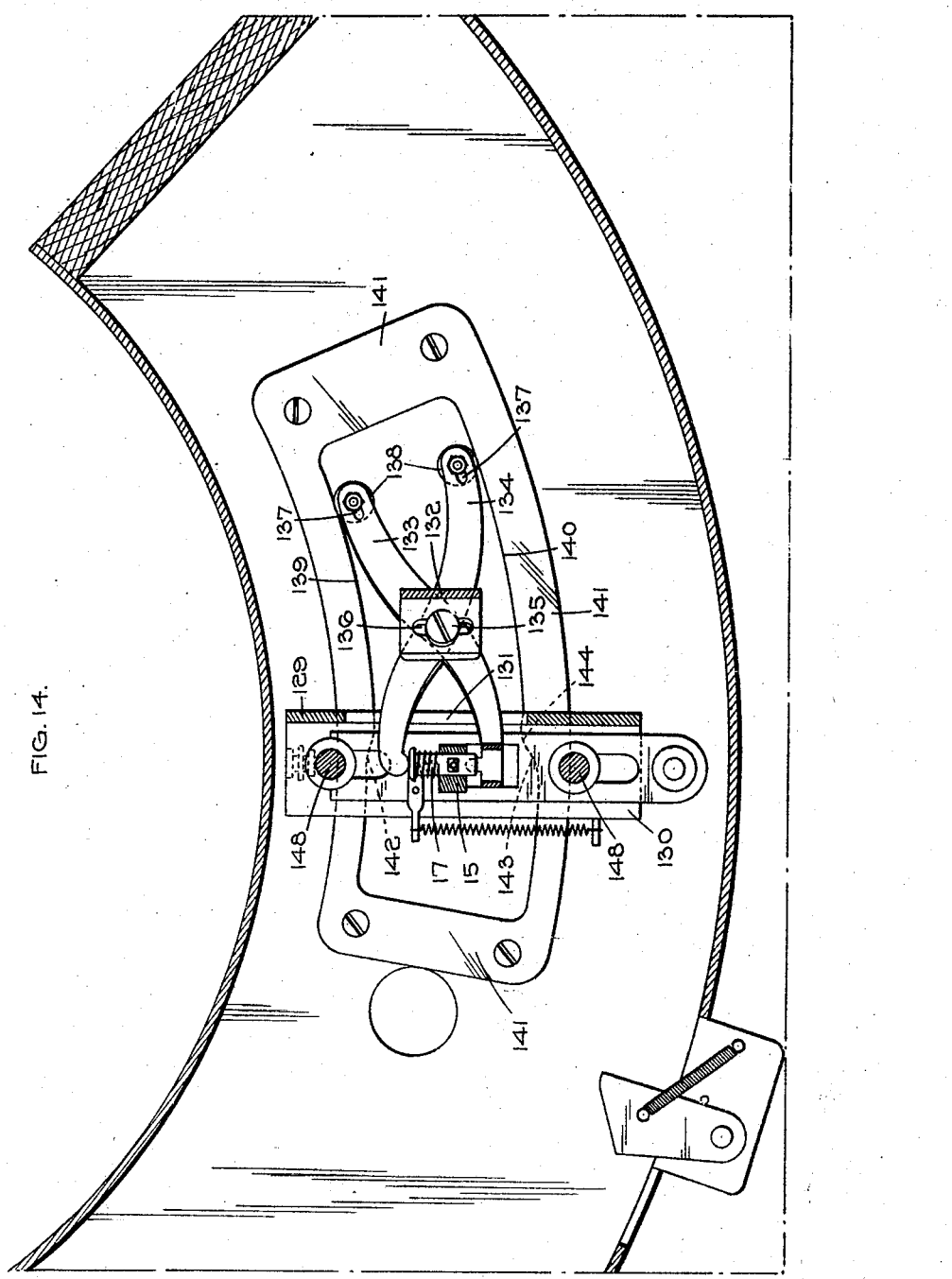

Jan. 6, 1931.  G. B. KING  1,788,304
GRAMOPHONE
Filed April 8, 1929  10 Sheets-Sheet 9

INVENTOR
George B. King
BY *Munn&Co.*
ATTORNEYS

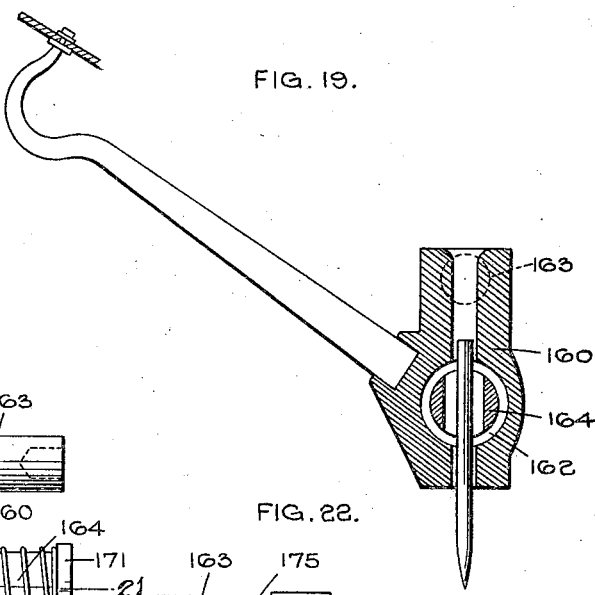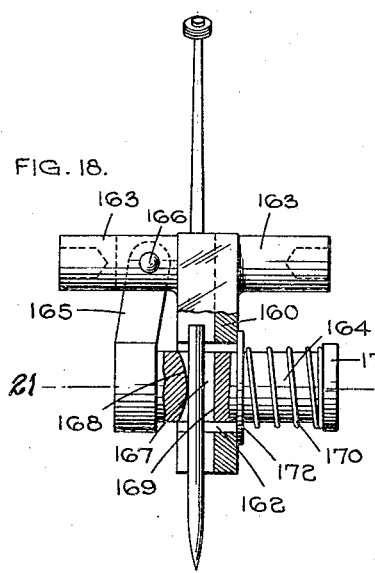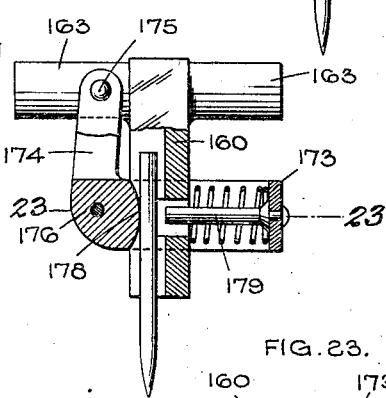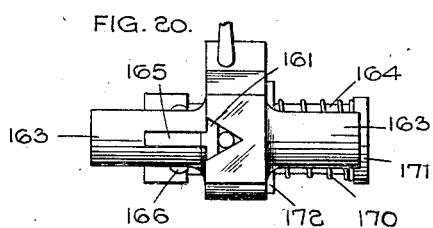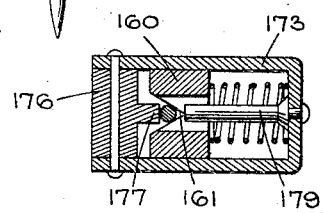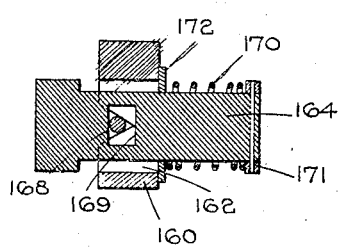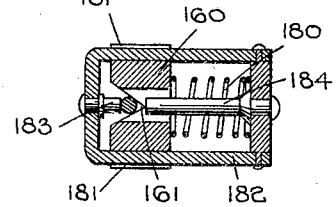

Patented Jan. 6, 1931

1,788,304

UNITED STATES PATENT OFFICE

GEORGE BASIL KING, OF EDGBASTON, BIRMINGHAM, ENGLAND

GRAMOPHONE

Application filed April 8, 1929, Serial No. 353,543, and in Great Britain April 17, 1928.

This invention relates to gramophones and has for its object to provide improved apparatus for releasably holding the needle and improved apparatus for releasing the needle holder when it is required to replace the needle.

A further object of the present invention is to provide apparatus which will be relatively simple to construct and assemble and which will be certain in operation and which can be operated satisfactorily without the exercise of any great skill.

A further object of the present invention is to construct a needle holder and its operating mechanism so that the operation of the needle holder for releasing the needles will not cause any undue strain to be applied to the diaphragm of the sound box.

A further object of the present invention is to construct the needle holder so that it will operate satisfactorily with needles of any diameter within the usual range of diameters employed for gramophone needles.

A further object of the present invention is to construct the apparatus so that when the needle holder is released the needle is automatically positively moved in the holder so that it will be free to drop out.

Referring to the drawings:—

Figure 5 is a sectional view on line 5—5 of Figure 2.

Figure 6 is a plan view of the apparatus shown in Figure 5.

Figure 7 is a side view of the sound box to which the needle gripper is applied.

Figure 8 is a view looking upon the under side of the sound box.

Figure 9 is a front view of the sound box.

Figure 10 is a sectional view on line 10—10, Figure 7.

Figure 11 is a sectional view on line 11—11, Figure 10.

Figure 12 is a plan view showing another form of operating means for the needle gripper.

Figure 13 is a sectional view in side elevation of the apparatus shown in Figure 12 but with the needle gripper in the loading position.

Figure 14 is a section on line 14—14 of Figure 13.

Figure 18 is a side view partly in section showing a modified form of needle gripper.

Figure 19 is a sectional front view of the gripper shown in Figure 18.

Figure 20 is a plan view corresponding with Figure 18.

Figure 21 is a sectional view on line 21—21, Figure 18.

Figure 22 is a side view partly in section showing a further form of gripper constructed in accordance with this invention.

Figure 23 is a section on line 23—23, Figure 22.

Figure 24 is a sectional plan showing a further modification.

Figure 1:
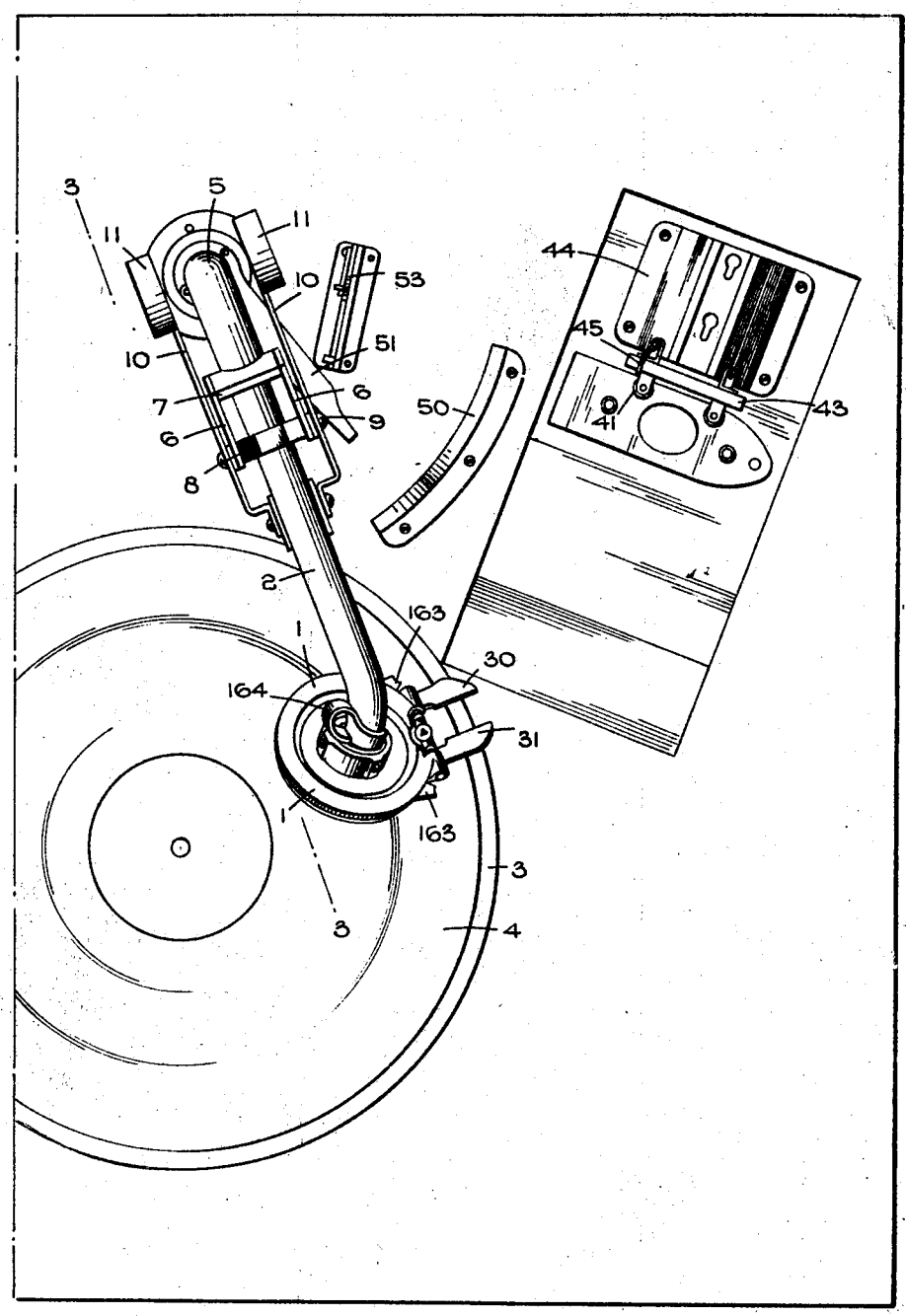
Figure 1 is a plan view showing a gramophone fitted with apparatus in accordance with the present invention.
Figure 2:
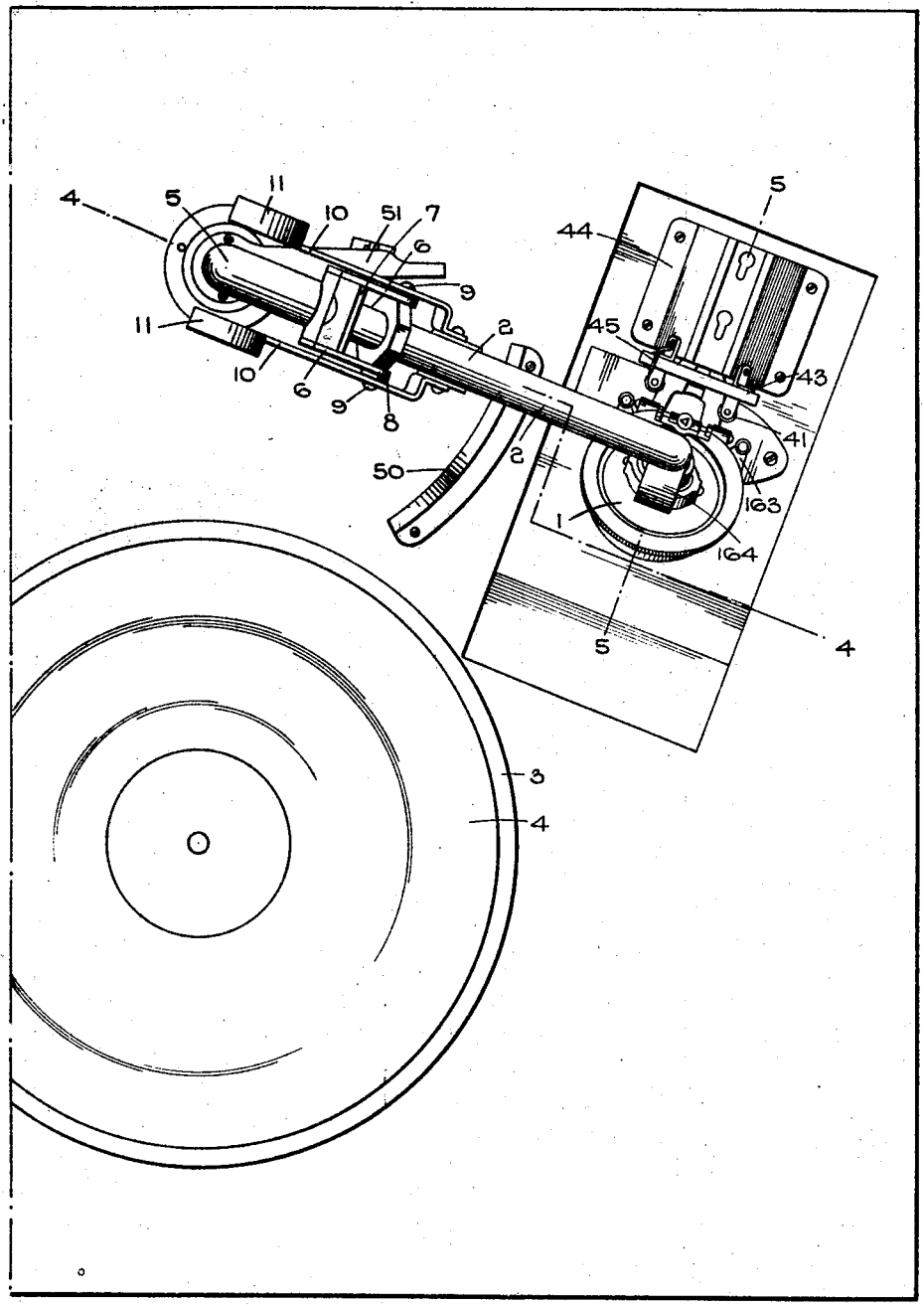
Figure 2 is a plan view showing the gramophone when the needle gripper has been moved into its released position.

In the construction illustrated in Figures 1 to 11, the invention is shown applied to a gramophone having a sound box 1 and tone arm 2 although it is to be understood that these may be replaced by an electrical reproducer which may be carried on a pivoted arm which, however, need not be hollow.

In the arrangement shown the turntable is shown at 3 and a record 4 is in position.

The tone arm 2 has a second part 5 which is mounted to swing about a vertical axis in the well known way. The parts 2 and 5, however, are attached together pivotally as shown clearly in Figures 3 and 4.

The part 5 is provided with a bracket having two jaws 6 and the part 2 is provided with an end plate 7 of arcuate form adapted to swing in contact with the end of the part 5 and between the jaws 6.

The part 2 is further provided with a collar 8 which is pivoted at 9 to the jaws 6.

The part 2 may carry a pair of levers 10 each having a balancing weight 11 for the purpose of counter-balancing the additional weight of the sound box as compared with an ordinary sound box due to certain mechanism which is mounted thereon and which will be hereinafter described.

The sound box, see particularly Figure 5, has a diaphragm 12 to which is attached one end of a stylus bar 13 the stylus bar being pivotally or equivalently mounted at 14 and incorporating a needle gripper 15.

It is usual in gramophone sound boxes for the axis of the needle holder to be parallel to the plane of the diaphragm but it will be observed that we have adopted a construction in which the axis of the needle holder is set at an obtuse angle in relation to the plane of the diaphragm.

It will be observed that the needle gripper which is shown more clearly in Figures 10 and 11 is provided with a hole 16 which extends completely therethrough so that the needles can be fed in from the end opposite to that from which they project when working.

Further, it will be observed that the axis of the needle gripper and the plane of the diaphragm of the sound box if extended will both pass through the point about which the stylus bar as a whole is pivoted.

The needle gripper is designed to accommodate any diameter of needle which is within the usual range of diameters of gramophone needles and in the construction shown in Figures 10 and 11 the needle gripper comprises the member 15 having the continuous hole therethrough. The upper part of the hole may be of tapering form as shown and the hole may be of triangular section as shown in Figure 11 the needle contacting two sides of the triangle.

Extending transversely through the member 15 is a hole in which is placed a sliding pin 17 which forms the movable member of the needle gripper. This sliding pin has an enlarged head 18 under which operates a spring 19 tending to move the pin to the right as seen in Figure 9.

The pin 17 is provided with a rectangular hole 20 through which the shank of the needle passes and if required one end 21 of this hole may be of convex form as shown.

As shown in Figures 10 and 11 the needle holder is gripping a needle, the surface 20 pressing the needle laterally into the angle formed at the right hand side of the triangular hole through the member 15.

The pin 17 is slotted as shown at 22 and a pin 23 in the member 15 passes through the slot in order to prevent the pin 17 from turning on its own centre.

Further, the end of the pin 17 carries a transverse pin 24 which limits bodily the movement of the pin 17 under the influence of the spring 19.

It will be observed that if the head 18 of the pin is pushed towards the member 15, the convex surface 21 will move away from the shank of the needle so that the needle will then be released. In order to prevent the needle from remaining in the angle of the triangular hole 16 (see Figure 11) the opposite end 25 of the opening 20 advances towards the right hand side of the needle and pushes it out of the angle so that it is positively released and will therefore drop under gravity.

The upper part of the member 15 is provided with lateral trunnions or bosses 26 the axis of which is parallel to the axis of the pin 17 and these trunnions are engaged by pins 27 with balls 28 interposed between the ends of the pins and the ends of recesses 29 in the trunnions 26.

By mounting the member 15 in this manner it is able to pivot about the axis 14 which is of course the centre line of the pins 27.

For operating the pin 17 to release and eject the needle we may provide a pair of levers 30, 31 these levers being pivoted at 32 and 33 respectively to a bracket 34 which is fixed to the sound box.

The two levers 30, 31 are acted upon by a spring 35 which tends to move them apart and they are each provided with a heel piece 36 between which is a stop 37 formed by the head of a screw so that the outward movement of the two levers under the pressure of the spring 35 is limited.

The lever 30 is provided with a pair of cheeks 38 which are adapted to come into contact with one side of the member 15 while the lever 31 is adapted to engage the head 18 of the pin 17.

Both levers are provided with inclines 39 and the lever 31 is provided with a projection 40.

The levers are operated to release the needle gripper when the tone arm 2 is swung to the side of the turntable, inclines 39 of the levers coming into contact with rollers 41 mounted on a carriage 42 which is slidably mounted in guides 43 fixed to a bracket 44 on the structure of the machine at the side of the turntable.

It will be observed that the carriage 42 can slide in a direction substantially parallel to the axis of the pin 17 so that the two rollers 41 are self centering in relation to the levers 30 and 31, the two levers consequently being operated simultaneously it being impossible to exert pressure on one side of the needle gripper without exerting an equal and opposite pressure upon the opposite side.

Thus when release of the needle gripper occurs, the member 15 is supported by the cheeks 38 as soon as the pin 17 commences to be moved by the lever 31.

In the construction illustrated, however, the carriage 42 is slidably mounted and it may be acted upon by a spring such as 45 and a stop plate 46 may be provided limiting its movement under the action of the spring.

It should be observed that the lever 31 which operates the pin 17 is provided with the projection 40 so that the pin 17 will be moved inwardly a sufficient distance to enable its surface 25 to push the gramophone needle out of the angle of the slot in the member 15 but the projection 40 will pass the roller 41 before the loading position is reached so that the pin 17 is permitted to move back again sufficiently far to enable the fresh needle to enter the gripper without encountering obstruction from the pin 17.

Figure 3:
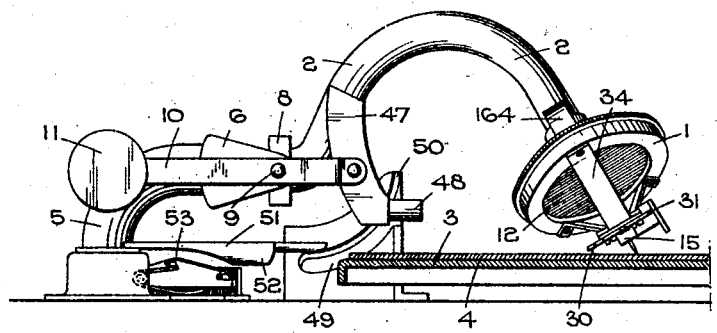
Figure 3 is a view upon a larger scale in section on line 3—3 of Figure 1.
Figure 4:
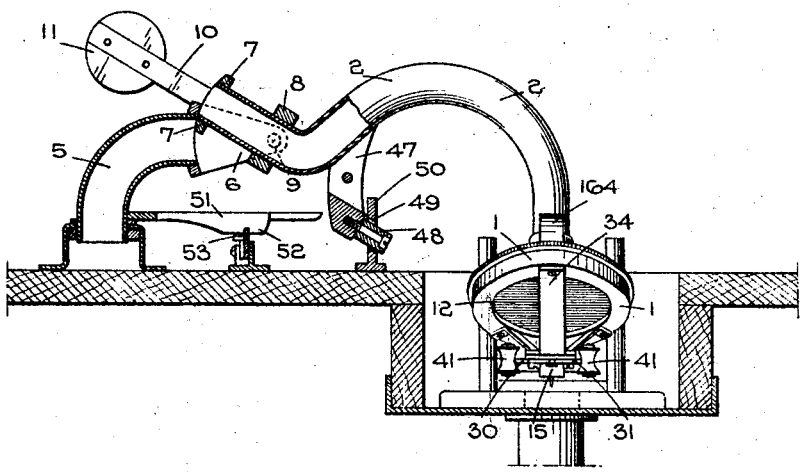
Figure 4 is a view in section on line 4—4 of Figure 2.

Referring particularly to Figures 3 and 4 it will be seen that the tone arm part 2 is provided with a downwardly projecting bracket 47 which bracket carries a roller 48. This roller engages in a slot 49 in a guide member 50 fixed at the side of the machine this engagement ensuring that when the tone arm is swung to the side of the turntable it will be moved into the correct position relative to the rollers 41 and a needle feeding mechanism. Further the provision of the guide 50 ensures that the tone arm will be moved into a position to bring the axis of the needle gripper substantially vertical, this provision being desirable in order to ensure that the spent needle will drop out of the gripper immediately the gripper is released. The pivotal joint 9 in the tone arm enables the tone arm part 2 to move into the required position.

The tone arm part 5 is provided with a projecting arm 51 having a wedge shaped projection 52 on its under side and when the tone arm is swung into the loading position the projection 52 rides over a spring pressed nose 53 which enables the operator to feel when the movement is complete. If the operator moves the edge of the projection 52 over the highest point of the nose 53 the spring pressure on the nose 53 may be sufficient to ensure that the movement is completed.

The needles may be released before the loading position (shown in Figure 6) is reached and in the construction illustrated the needles are released before this position is reached the needle gripper being moved into its open or released position and retained in such position by the levers 30, 31 during the loading operation and the needle gripper remaining released until the tone arm has been moved back towards the turntable sufficiently for the levers 30, 31 to leave the rollers 41.

In the construction shown in Figures 12 to 14 the sound box 1, turntable 3 and tone arm 2 and 5 together with the guide 50 and the parts 47, 48 and 49 are constructed substantially as described with reference to Figures 1 to 11.

In the construction shown in Figures 12 to 14 the needle magazine 54 may be of substantially the same form as that described in our British specification 315737.

In this construction the magazine is detachably mounted upon a supporting arm 124 mounted so that it can swing about the same centre as the part 5 of the tone arm.

The arm 124 is acted upon by a spring 125 and is adapted to move between stops 126 and 127.

The arrangement is such that the tone arm can be swung to the side of the turntable and will engage with a suitable part of the arm 124 after which the tone arm and the arm 124 will move together until the arm 124 comes into contact with the stop 127.

The free end of the arm 124 is provided with keyhole slots 128 for engagement by the studs on the under side of the magazine and the free end of the arm is downwardly cranked as shown at 129 and has its extremity 130 extending horizontally.

A part 129 is slotted as shown at 131 and on the under side of the arm 124 is fixed a depending bracket 132 to which a pair of scissor like levers 133 and 134 are attached by a pivot pin 135.

A bracket 132, however, is slotted as shown at 136 in order to allow the levers 133 and 134 to centre themselves in relation to the needle gripper.

It will be understood that the needle gripper operating levers 30 and 31 shown in Figures 1 to 11 are omitted from this construction and the levers 133 and 134 are employed in their place and operate in substantially the same manner.

One end of each lever 133, 134 is slotted as shown at 137 and rollers 138 are provided the axle pins of which engage the slots 137. This allows of adjustment of the rollers on the levers so that the opening of the needle holder may be timed.

These rollers 138 engage the surfaces 139 and 140 of a cam plate 141 fixed to the structure of the machine, the surfaces 139 and 140 including inclines 142 and 143 which cause the levers to be closed on the gripper when the arm 124 is swung towards the stop 127.

Further the surface 140 adjacent to the incline 143 is provided with a projection 144 causing the lever 134 to make an ejecting movement in the same way that the lever 31 operates as has already been described.

As the arm 124 and the parts associated therewith may be of considerable weight the arm may be provided with a supporting roller 145 adapted to run on the fixed structure at the side of the turntable.

For positioning the sound box in relation to the end of the arm 124 the sound box may be provided with two projecting plates 163 which come into contact with the posts 148.

Figure 15:
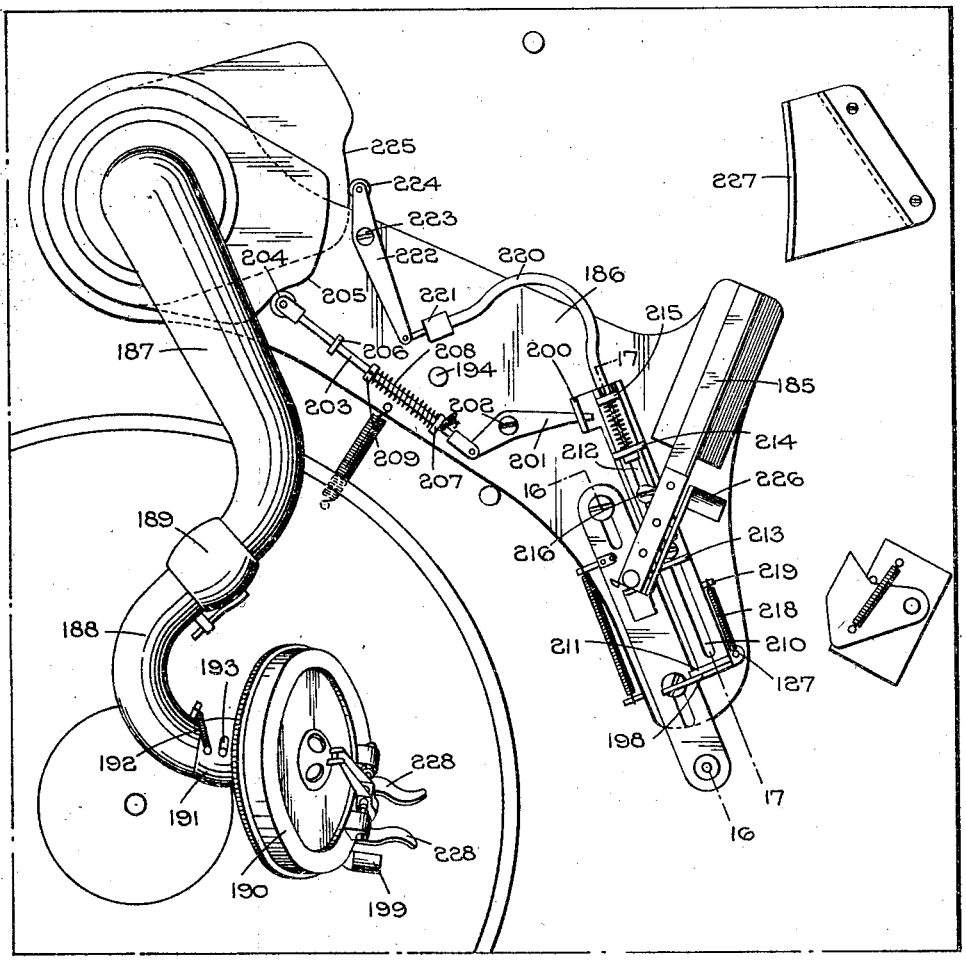
Figure 15 is a plan view showing another form of operating means for the gripper.
Figure 16:
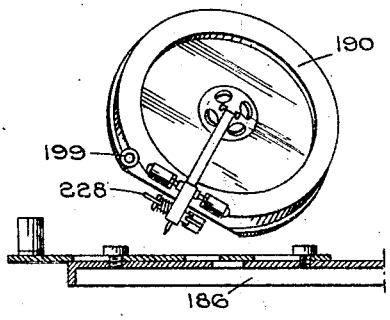
Figure 16 is a section on line 16—16 of Figure 15.
Figure 17:
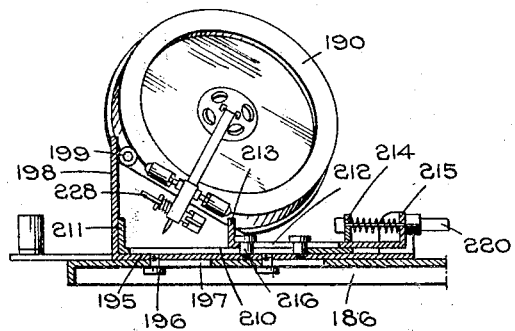
Figure 17 is a section on line 17—17 of Figure 15.

In the construction shown in Figures 15, 16 and 17, the magazine 185 carrying the supply of fresh needles is mounted upon an arm 186 which is similar to the arm 124 inasmuch as it is pivoted about the same centre as that upon which the tone arm turns.

In the arrangement shown in Figures 15, 16 and 17, the tone arm is in two parts 187 and 188 between which is a pivoted joint 189 which allows the sound box to be turned upwardly away from the record when required. The joint 189, however, is provided with a stop limiting the downward movement of the part 188.

The sound box 190 is pivotally mounted by means of the joint 191 on the end of the part 188 so that the sound box can turn about a horizontal axis at right angles to the axis of the pivot of the needle holder this movement taking place against the action of a spring 192, the motion being limited by a pin and slot connection 193. This movement is provided to allow the sound box to be rotated to bring the needle into a substantially vertical position so that when the needle holder is released the needle will move freely therein by gravity.

This movement of the sound box is effected automatically when the tone arm is swung to the side of the turntable and caused to swing the arm 186. On the arm 186 is a stop 194 which is engaged by the tone arm so that further movement of the tone arm causes the arm 186 to swing on its pivot.

On the arm 186 is mounted a sliding plate 195, this plate having pins 196 which slide in guide slots 197 on the arm 186.

The end of the plate 195 is turned upwardly, as shown at 198, and the part 198 is adapted to engage a roller 199 mounted on the sound box so that when the plate 195 is moved to the right (see Figure 17) the sound box is rotated about its own centre until the needle comes into a substantially vertical position (as seen in Figure 17).

The necessary sliding movement is imparted to the plate 195 by providing the plate 195 with a lug 200 having an opening in which engages one end of a lever 201 pivoted at 202 to the arm 186. The lever is operated by a sliding rod 203 having a roller 204 which engages a fixed cam 205.

The rod 203 is suitably guided by guides 206 and 207 and a spring 208 is provided acting on a collar 209 to keep the roller 204 in contact with the cam.

Thus when the arm 186 is swung, the plate 195 slides in such manner as to pull the sound box into the required position.

The means for releasing the needle gripper are mounted on the plate 195 and consist of a plate 210 having an upwardly projecting end 211 and a plate 212 having an upwardly projecting end 213.

The plate 210 is provided with an ear 214 by which it may be operated while the plate 212 is provided with an ear 215 by which it may be operated.

The two parts 211 and 213 form the means of operating the needle gripper and it will be seen that both the plates 210 and 212 have a floating movement substantially parallel to the axis of the movable member of the needle gripper, both of these plates being slotted and guided on pins 216 provided on the plate 195.

The plate 195 is provided with an ear 217 which is connected by a light spring 218 to a projection 219 on the plate 210.

The gripper 211, 213 is operated by means of flexible transmission mechanism such as a Bowden cable 220 the outer member of which engages the part 215 and the inner member of which engages the part 214.

At its opposite end the Bowden cable 220 has its outer member engaging a bracket 221 and its inner member engaging a lever 222 pivoted at 223 to the arm 186.

The second arm of the lever 222 has a roller 224 which engages a fixed cam 225 and the arm 186 is swung so that the needle gripper is operated at the correct time.

Levers 228 may be pivoted to a bracket on the sound box for engaging the needle gripping device upon opposite sides and the members 211 and 213 may engage these levers.

The needle magazine may be arranged so that the fresh needles are fed one by one by means of a plunger operated by a projection 226 engaging a fixed cam 227.

Instead of mounting the plate 195 and the operating means for the needle gripper which are carried thereon to have a simple sliding movement of the arm 186 the plate 195 carrying the needle gripper operating means may be mounted so that it can pivot on a horizontal pivot in addition to sliding. By these means the parts 198, 211 and 213 may move in a curved path and may follow the needle gripper round as the sound box turns and the amount of clearance between the parts 211 and 213 may be very considerably reduced.

In all the constructions described the tone arm may be provided with a handle such as 164 to facilitate its movement.

Further, although in the constructions illustrated the tone arm is adapted to be moved by hand it is to be understood that the tone arm and/or the second arm may be moved by power such as electrical power or the power of the turntable motor if required.

In Figures 18 to 21 a modified form of needle gripper is shown in which the stationary member 160 is provided with a groove 161 of V section extending down one side.

The member 160 is further provided with a clearance hole 162 arranged transversely with respect to the length of the groove 161.

At the top the member 160 is provided with trunnions 163 which are similar to the trunnions described with reference to Figures 10 and 11 and which may be similarly supported.

In the construction shown in Figures 18 to 21, however, the movable member takes the form of a pin 164 attached to a lever 165 pivoted at 166, the pin 164 being provided with a hole or opening 167 one end 168 of which is convex and presses the needle into the groove 161, the other end 169 of the hole which may be flat, operating to press the needle out of the V groove when the gripper is released.

The pin 164 is provided with a spring 170 which presses against the head of the pin 171 and against a washer 172.

A somewhat similar construction is shown in Figures 22 and 23 but in this case the movable member takes the form of a stirrup 173 carried by a lever 174 pivoted at 175, the stirrup being attached to the lever by means of a lever 176.

In this case the lever is provided with a projection 177 the end 178 of which may be convex which serves to press the needle into the V groove 161 of the stationary member while the stirrup 173 is provided with a pin 179 which operates as an ejector to push the needle out of the V groove when the gripper is open.

The sides of the stirrup 173 engage the sides of the stationary member 160 as shown in Figure 22.

In the construction shown in Figure 24 the stationary member 160 is provided with transverse grooves 181 in its sides and a stirrup 182 is arranged to slide in these grooves with rectilinear motion one end of the stirrup having a pin 183 for pressing the needle into the V groove 161 and the other end of the stirrup having a pin 184 which acts as an ejector.

The stirrup 182 is provided with a spring 180 serving to retain the needle gripper in its closed position.

Claims.

1. In a gramophone the combination of a stylus bar, a needle gripper on said stylus bar, having a movable gripping member, mounted for movement in a direction transverse to the axis of the needle, and operating means for the gripper including members for engaging the gripper at opposite sides and applying thereto equal and opposite forces.

2. In a gramophone the combination of a stylus bar, a needle gripper on said stylus bar, having a movable gripping member, mounted for movement in a direction transverse to the axis of the needle, and operating means for the gripper including a member having floating movement, substantially parallel to the direction of movement of the movable gripping member.

3. In a gramophone the combination of a stylus bar, a needle gripper on said stylus bar, having a movable gripping member, mounted for movement in a direction transverse to the axis of the needle, and operating means for the gripper including a pair of levers adapted to engage one on either side of the gripper, and means for causing them to engage opposite sides of the gripper.

4. In a gramophone the combination of a stylus bar, a needle gripper on said stylus bar, having a movable gripping member, mounted for movement in a direction transverse to the axis of the needle, operating means for the gripper including a pair of levers adapted to engage one on either side of the gripper, and means for causing them to engage opposite sides of the gripper, said means including a carriage having a pair of spaced abutments and mounted for floating movement parallel to the movement of the movable gripping member.

5. In a gramophone the combination of a stylus bar, a needle gripper on said stylus bar, having a movable gripping member, mounted for movement in a direction transverse to the axis of the needle, operating means for the gripper including a pair of levers adapted to engage one on either side of the gripper, said levers having their ends shaped as cam surfaces, and means for causing them to engage opposite sides of the gripper, said means including a carriage having a pair of spaced abutments and mounted for floating movement parallel to the movement of the movable gripping member.

6. In a gramophone the combination of a stylus bar, a needle gripper on said stylus bar, having a movable gripping member, mounted for movement in a direction transverse to the axis of the needle, operating means for the gripper including a pair of levers adapted to engage one on either side of the gripper, said levers having their ends shaped as cam surfaces, means for causing them to engage opposite sides of the gripper, said means including a carriage having a pair of spaced abutments and mounted for floating movement parallel to the movement of the movable gripping member and a spring to cause said levers to interlock with said abutments.

7. In a gramophone the combination of a stylus bar, a needle gripper on said stylus bar, having a movable gripping member, mounted for movement in a direction transverse to the axis of the needle, a reproducer, and operating means for the gripper including a pair of levers on the reproducer, and means for causing them to engage opposite sides of the gripper.

8. In a gramophone the combination of a quick release needle gripper and operating means therefor comprising a pair of members mounted on a movable arm at the side of the turntable, the said members being adapted to be operated to release the needle gripper by means of flexible transmission mechanism.

9. In a gramophone the combination of a stylus bar, a needle gripper on said stylus bar, said needle gripper comprising a fixed member rigidly connected to said stylus bar and a movable gripping member mounted for movement in a direction transverse of the axis of the needle, the needle contacting at two spaced points with the fixed member of the gripper and the movable member of said gripper contacting the needle at a point intermediate said two spaced points.

10. In a gramophone the combination of a stylus bar, a needle gripper on said stylus bar, said needle gripper comprising a fixed member rigidly connected to said stylus bar and a movable gripping member mounted for movement in a direction transverse of the axis of the needle, the needle contacting at two spaced points with the fixed member of the gripper and the movable member of said gripper contacting the needle at a point intermediate said two spaced points, a spring acting between said fixed and said movable members for holding said needle rigidly between the point of contact on the movable member and the two spaced points of contact on the fixed member.

11. In a gramophone the combination of a stylus bar, a needle gripper on said stylus bar, said needle gripper comprising a fixed member rigidly connected to said stylus bar, said fixed member having a longitudinal opening and a transverse guide, a movable gripping member mounted for movement in said guide, the needle contacting at two spaced points with the fixed member of the gripper and the movable member of said gripper contacting the needle at a point intermediate said two spaced points, a spring acting between said fixed and said movable members for holding said needle rigidly between the point of contact on the movable member and the two spaced points of contact on the fixed member.

12. In a gramophone the combination of a stylus bar, a needle gripper on said stylus bar, said needle gripper comprising a fixed member rigidly connected to said stylus bar and a movable gripping member mounted for movement in a direction transverse of the axis of the needle, the needle contacting at two spaced points with the fixed member of the gripper and a movable member of said gripper contacting the needle at a point intermediate said two spaced points, the side of said movable member engaging the needle being concave in longitudinal cross section to facilitate releasing of the needle.

13. In a gramophone the combination of a stylus bar, a needle gripper on said stylus bar, said needle gripper comprising a fixed member rigidly connected to said stylus bar and a movable gripping member mounted for movement, said movable member comprising a stirrup member, the parallel arms of which member embrace the fixed member of the gripper, said movable member being mounted for movement in a direction transverse of the axis of the needle, the needle contacting at two spaced points with the fixed member of the gripper, and the movable member of said gripper contacting the needle at a point intermediate said two spaced points.

14. In a gramophone the combination of a stylus bar, a needle gripper on said stylus bar, said needle gripper comprising a fixed member rigidly connected to said stylus bar and a movable gripping member mounted for movement, said movable member comprising a stirrup member, the parallel arms of which member embrace the fixed member of the gripper, the needle contacting at two spaced points with the fixed member of the gripper, said movable member having a gripping portion for engaging the needle at a point intermediate said two spaced points and having an ejecting portion for releasing the needle.

15. In a gramophone the combination of a stylus bar, a needle gripper on said stylus bar, said needle gripper comprising a fixed member rigidly connected to said stylus bar and a movable gripping member mounted for movement, said movable member comprising a stirrup member, the parallel arms of which member embrace the fixed member of the gripper, said movable member being mounted for movement, the needle contacting at two spaced points with the fixed member of the gripper, said movable member having a gripping portion for engaging the needle at a point intermediate said two spaced points and having an ejecting portion for releasing the needle, a spring acting between said fixed and said movable members for holding said needle rigidly between the point of contact on the movable member and the two spaced points of contact on the fixed member.

In witness whereof I affix my signature.

GEORGE BASIL KING.